Nov. 13, 1962  W. S. APPLEMAN  3,063,586
REFUSE HANDLING VEHICLE
Filed Nov. 20, 1959  4 Sheets-Sheet 1

INVENTOR.
WILLIAM S. APPLEMAN
BY
Barnes, Kisselle, Raisch & Choate
ATTORNEYS

Nov. 13, 1962 W. S. APPLEMAN 3,063,586
REFUSE HANDLING VEHICLE
Filed Nov. 20, 1959 4 Sheets-Sheet 2
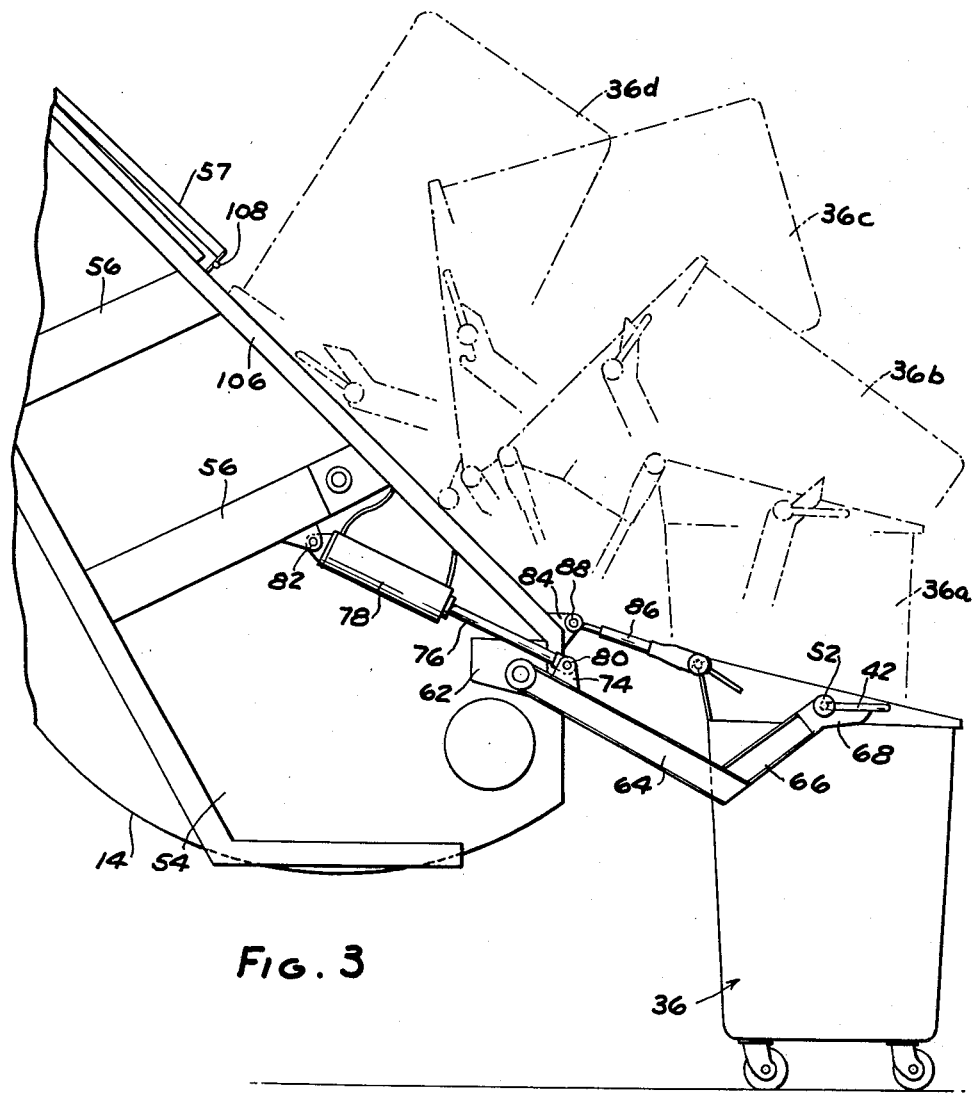
FIG. 3
FIG. 4
INVENTOR.
WILLIAM S. APPLEMAN
BY
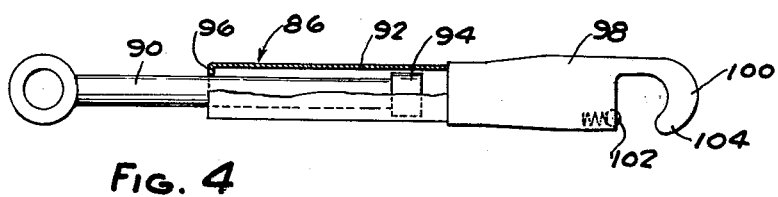
ATTORNEYS Nov. 13, 1962 W. S. APPLEMAN 3,063,586
REFUSE HANDLING VEHICLE
Filed Nov. 20, 1959 4 Sheets-Sheet 3
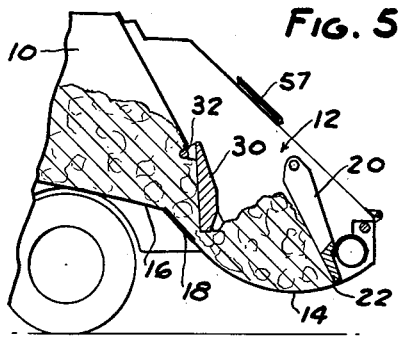
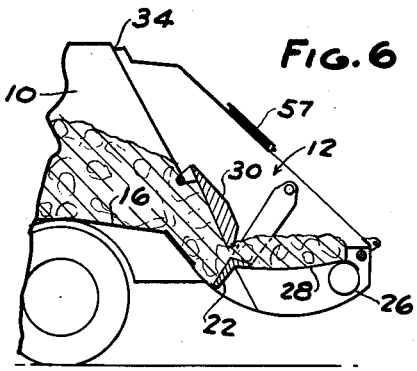
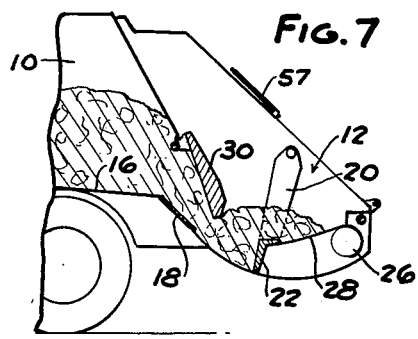
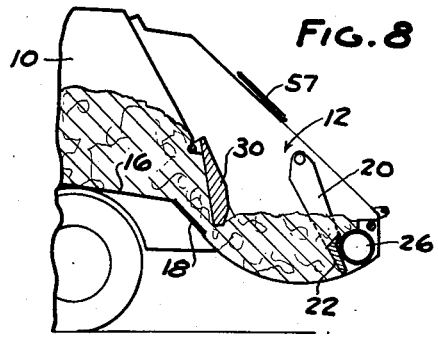
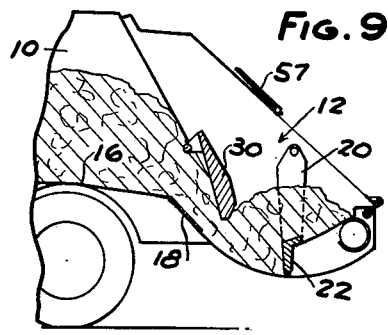
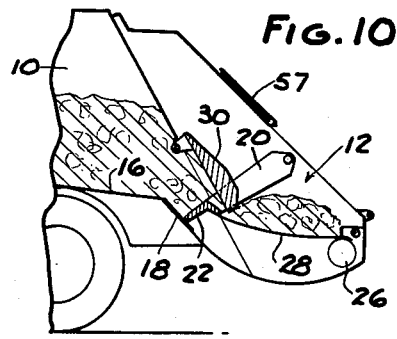
*INVENTOR.*
WILLIAM S. APPLEMAN
BY
ATTORNEYS Nov. 13, 1962  W. S. APPLEMAN  3,063,586
REFUSE HANDLING VEHICLE
Filed Nov. 20, 1959  4 Sheets-Sheet 4

INVENTOR.
WILLIAM S. APPLEMAN
BY
Barnes, Kisselle, Raisch & Choate
ATTORNEYS

United States Patent Office 3,063,586
Patented Nov. 13, 1962

3,063,586
REFUSE HANDLING VEHICLE
William S. Appleman, Findlay, Ohio, assignor to Young Spring & Wire Corporation, Detroit, Mich., a corporation of Michigan
Filed Nov. 20, 1959, Ser. No. 854,319
20 Claims. (Cl. 214—302)

This invention relates to a refuse handling vehicle and more particularly to a vehicle having a refuse storage compartment with a hopper at the rear end thereof and means for moving and packing refuse deposited in the hopper into the storage compartment.

Refuse handling vehicles of the above described type are in common use and have produced substantial economies for municipalities and private enterprises engaged in the business of collecting and disposing of rubbish. With vehicles of this type, the rubbish collectors simply dump the rubbish into the hopper and means are provided for automatically transferring and packing this rubbish into the storage compartment of the vehicle. One problem that arises with vehicles of this type is that large institutions such as hospitals and other enterprises producing large amounts of refuse usually deposit their rubbish in large containers, too large to be handled manually to dump the containers into the hopper of the vehicle. Thus, arrangements have been proposed heretofore for mechanically dumping the large containers into the hoppers.

The present invention is directed to an improved construction for mechanically dumping by power actuated means large containers into the hopper of the vehicle.

It is an object of this invention to provide a refuse vehicle of the described type having power operated means thereon for lifting and dumping large containers into the hopper of the vehicle with a minimum of difficulty.

A further object of the invention resides in the provision of power operated means at the rear end of the vehicle that are designed to engage lift and dump containers of different sizes and also containers disposed at different elevations with respect to the hopper of the vehicle.

A further object of the invention is to provide a container handling mechanism of the type described which is designed to lift a rubbish container and pivot it to a substantially inverted position over the deepest part of the hopper on the vehicle.

More specifically, the container handling and dumping mechanism of the present invention includes a pair of arms mounted one on each side of the hopper. These arms are pivotally supported on the vehicle and are adapted to be raised and lowered by a hydraulic cylinder. The arms are fashioned to engage handles on a rubbish container. There is also pivoted to the vehicle on opposite sides of the hopper a pair of links which are also adapted to be engaged with the container. The links are in the form of extensible radius rods which control the pivotal movement of the container to the inverted position as it is elevated by the lift arms.

In the drawings:

FIG. 3 is a fragmentary side elevational view of the rear end of the vehicle showing the manner in which the container handling mechanism of the present invention is designed to engage with, lift and invert a rubbish container.

FIG. 4 is a view partly in section of one of the links.

FIGS. 5 through 10 are generally schematic views showing the operation for moving the rubbish from the hopper, crushing it and packing it into the storage compartment of the vehicle.

Figure 1:
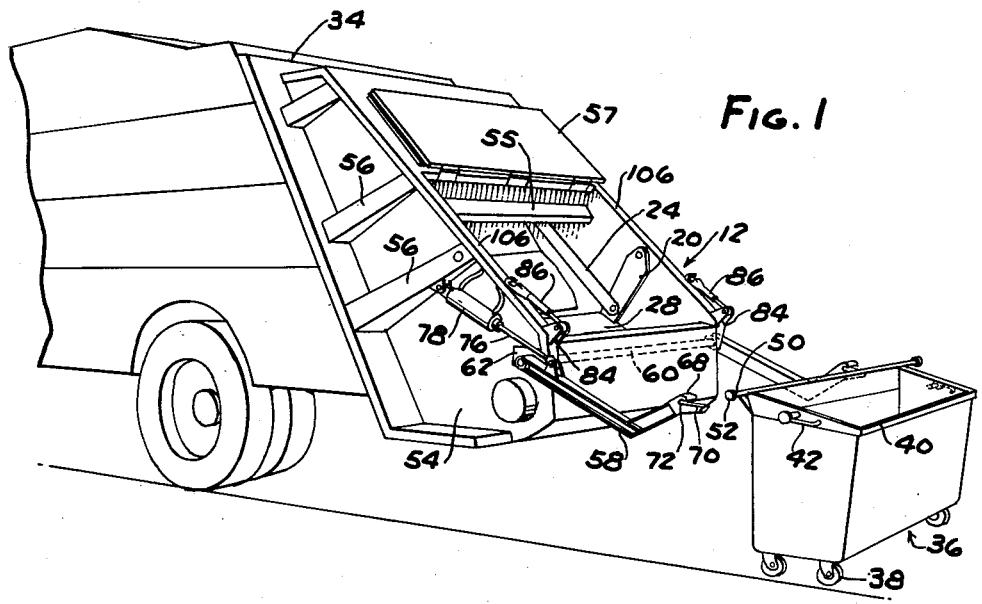
FIG. 1 is a fragmentary perspective view of the rear end of a vehicle of the present invention illustrating the container lifting and dumping mechanism.
Figure 2:
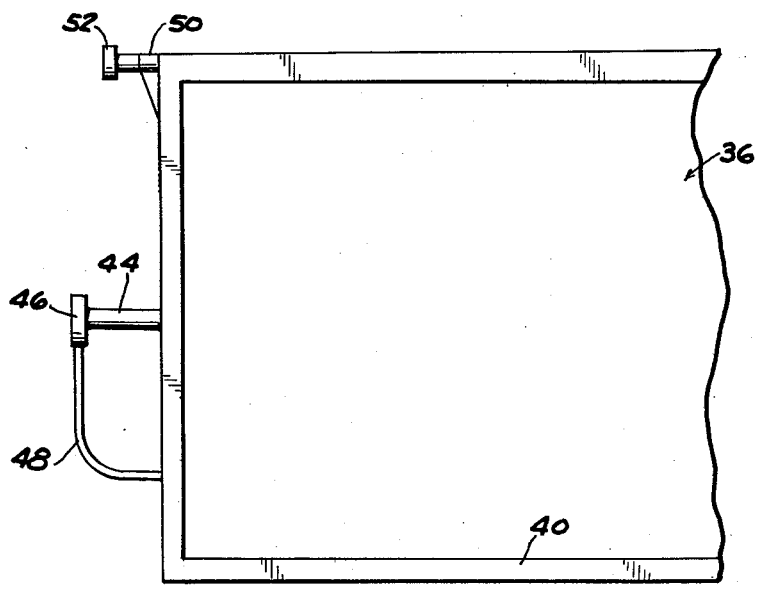
FIG. 2 is a fragmentary top plan view of the general type of container adapted to be used with the vehicle.

Referring first to FIGS. 1 and 5 through 10, the rear portion of the vehicle is there illustrated. The vehicle includes a storage compartment 10 which terminates at its rear end in a hopper 12, the bottom wall 14 of which is of generally arcuate shape and extends downwardly from the bottom wall 16 of the storage compartment 10. Between the bottom walls 14 and 16, there is arranged an anvil plate 18. Within hopper 12 is pivoted a pair of arms 20, one at each side of the hopper. The lower ends of arms 20 are connected by a delivery panel 22 extending transversely across the hopper. Arms 20 are cyclically reciprocated by means of links 24 connected to a power mechanism, not illustrated. When arms 20 are actuated, the delivery panel 22 is arranged to sweep over the bottom wall 14 of hopper 12 and thereby deliver refuse deposited in the hopper toward the storage compartment 10. At the rear end of the hopper 12, is arranged a roller 26 about which is wound an apron 28 having its free end connected to the delivery panel 22. As the delivery panel 22 sweeps forwardly in hopper 12, apron 28 is unwound from roller 26 and refuse is thereby prevented from becoming lodged behind the delivery panel 22.

There is also pivotally supported within hopper 12 crusher panel 30. Panel 30 is pivoted at each side of hopper 12 as at 32 so that the panel is normally disposed above the anvil plate 18. In FIG. 5, the delivery panel 22 and the crusher panel 30 are shown at the start of the cycle. From this position, delivery panel 22 swings forwardly and simultaneously therewith crusher panel 30 pivots upwardly in a counterclockwise direction, as is illustrated in FIG. 6. During this portion of the cycle, the rubbish previously crushed on anvil 18 is pushed forwardly into the storage compartment 10. On the return stroke of delivery panel 22 (FIG. 7), crusher panel 30 swings downwardly toward anvil 18 to crush and compact the refuse deposited on anvil 18 in the previous forward stroke of delivery panel 22. The crushing action of panel 30 against anvil 18 is completed when the delivery panel 22 is in the fully retracted position illustrated in FIG. 8. Then, on the next forward stroke of delivery panel 22 (FIG. 9), the previously crushed refuse on anvil 18 is packed into the storage compartment 10. Delivery panel 22 at the forward end of its stroke is illustrated in FIG. 10.

Hopper 12 is hinged to the storage compartment of the vehicle at its upper end as at 34 so that after the storage compartment 10 is filled with refuse, the contents of the storage compartment may be discharged by swinging hopper 12 upwardly and dumping the storage compartment 10 generally in the manner of a conventional dump truck.

Having now described the general construction and operation of a vehicle of this type, the specific improvement of this invention for mechanically handling large containers will now be described. Referring to FIGS. 1 and 3, a container of the type conventionally used by institutions producing a large amount of refuse is indicated at 36. Containers of this type are usually mounted on wheels or casters 38. At its upper end, the container is provided with a reinforcing frame 40 having handles 42 at opposite ends of the container. Each handle 42 includes a stub shaft 44 having an enlarged end 46 and a curved rod portion 48 which provides a loop formation to the handle. Along one longitudinal edge of frame 40, there is secured a shaft 50 projecting outwardly beyond the frame at each end and provided with enlarged ends 52.

At each side thereof, hopper 12 is provided with a side wall 54 which is reinforced by suitable bracing as at 56. The access opening 55 on the top side of the hopper is arranged to be closed when desired by a hinged cover 57. A pair of lift arms 58 positioned one at each side of hopper 12 are interconnected by a transversely extending shaft 60. Shaft 60 is journalled on the side walls 54 in bearings 62. Shaft 60 is located adjacent the rear end of hopper 12 at a point near the upper open end of the hopper. Each lift arm 58 comprises a pair of angularly related and fixedly connected members 64, 66 having a hook member 68 at the free end thereof. The two hook members 68 are adapted to engage with the stub shafts 44 of the container handles 42. Each hook member 68 includes a straight guide portion 70 terminating in a rearwardly opening socket 72 adapted to form a journal for the stub shafts 44 when the hook members are engaged with the handles of the container.

Each of the arms 58 has a crank portion 74 to which the outer end of a piston rod 76 associated with a cylinder 78 is connected as at 80. The head end of each cylinder 78 is pivotally mounted on a brace member 56 as at 82. Only one of the cylinders 78 is illustrated in FIGS. 1 and 3.

At the two upper rear corners of the hopper are mounted trunnion brackets 84. These brackets form pivotal supports for links or radius rods 86. Links 86 are pivoted to brackets 84 as at 88 for pivotal movement in vertical planes at each side of the hopper. Referring more particularly to FIG. 4, each link or radius rod 86 includes a rod 90 telescopically arranged within a sleeve 92. The end of rod 90 within sleeve 92 is fashioned with an enlarged head 94 and the end of sleeve 92 through which the rod 90 projects is turned inwardly as at 96 to limit the maximum extension of rod 90 and sleeve 92. On the opposite end of sleeve 92, there is secured a block 98 having a hook portion 100 and a spring biased detent 102 aligned with and spaced from the end 104 of hook portion 100. The distance between the end 104 of hook portion 100 and the detent 102 is slightly less than the diameter of shaft 50 on container 36. The particular construction shown of links 86 is not critical. It is merely important that the links be extensible and designed to engage the ends of shaft 50 on the container.

The two links 86 are spaced apart such that when the hooks 68 at the ends of arms 58 are engaged with the stub shafts 44 on the container, each link 86 can be pivoted downwardly about its pivotal connection 88 and snapped over the ends of shaft 50. Since each link 86 is freely extensible, the dimension between stub shafts 44 and the ends of shaft 50 on the container is not critical. If the size of the container permits, shafts 44 are located on the container in vertical alignment with the center of gravity of the container when filled with refuse so that when the shafts 44 are engaged by the hooks 68 at the ends of arms 58 and lifted, the container remains in a substantially upright position. On very large containers location of shafts 44 in vertical alignment with the center of gravity is impractical, as will be explained hereinafter.

FIG. 3 illustrates the manner in which the container 36 is engaged by arms 58 and links 86, elevated and then dumped into hopper 12. To engage the container with arms 58, the arms are initially adjusted so that the hooks 68 at the free ends thereof are horizontally aligned with the stub shafts 44. Suitable manual controls, not shown, are provided for operating hydraulic cylinders 78. The container is then rolled towards the hopper so as to engage the stub shafts 44 with the sockets 72 of the hook members 68. It will be appreciated that in relation to the showing of FIG. 3, the stub shafts 44 could be disposed at a higher or lower level without interfering with the interengagement of hooks 68 with the stub shafts. This is important because sometimes the container 36 might be located up on a curb above the level of the ground engaged by the vehicle wheels or the container might be supported on a surface below the normal ground level. After both hooks 68 are engaged with their respective stub shafts 44, the two links 86 are swung downwardly, extended the proper amount, and the hook portions 100 are snapped into engagement with the ends of shaft 50 on the container. With the container thus engaged with arms 58 and links 86, hydraulic fluid under pressure is admitted to the rod end of cylinders 78 to retract the piston rods 76 and thereby swing the arms 58 upwardly. Since the effective radius of arms 58 is greater than the effective radius of links 86, the links progressively extend as the arms 58 swing upwardly.

The container 36 is thus elevated from the ground surface in its normally upright position until it reaches approximately the position indicated in broken lines at 36a in FIG. 3. In this position of the container and the arms 58, links 86 are fully extended and therefore continued upward movement of arms 58 causes a progressive tilting movement of the container as controlled by the extended length of links 86. The container is thus progressively tilted in a counterclockwise direction as viewed in FIG. 3 to the broken line positions shown at 36b and 36c to its final inverted position illustrated at 36d wherein ends of frame 40 rest upon the rails 106 on the side walls 54 of the hopper. In the position 36d, it will be observed that the container is inverted over the deepest portion of the hopper. The container dumping attachment described thus utilizes the maximum capacity of the hopper which would not be the case if the container were arranged to dump its content into the hopper at a point directly adjacent the rear end of the hopper.

Figure 11:
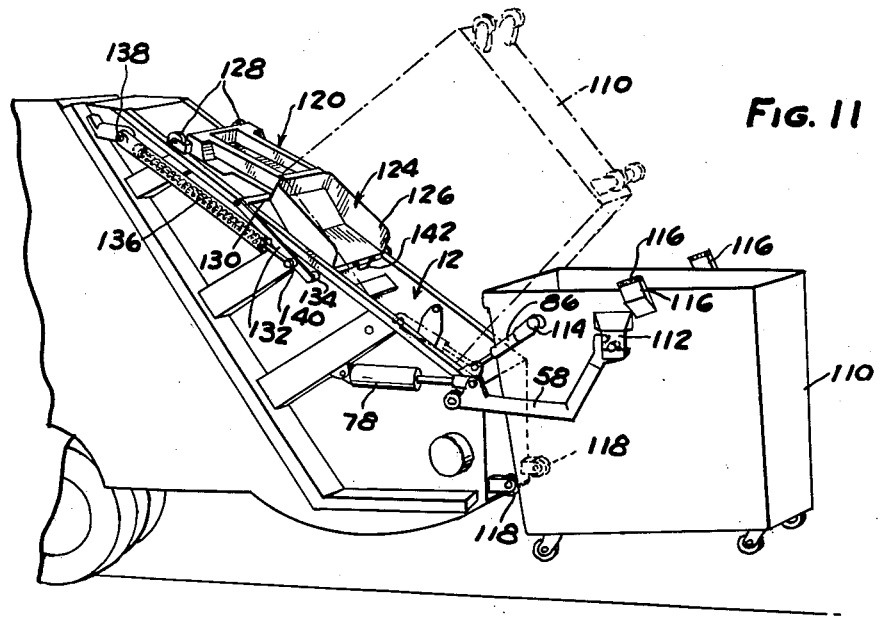
FIG. 11 is a perspective view of the rear end of a vehicle according to this invention designed for handling extremely large rubbish containers.

Referring to FIG. 3, it will be noted that the front to rear dimension of container 36 is such that in the inverted position of the container shown at 36d, the rear edge of the container, that is, the edge opposite that to which the radius rods 86 are connected, lies just to the rear of the hinge 108 of cover 57. Some institutions prefer to use rubbish containers substantially larger than container 36. An extra large container is shown at 110 in FIG. 11. Container 110, as is the case with container 36, is provided with handles 112 which are designed to be engaged by the hooked ends of lift arms 58 and with bosses 114 with which the three ends of links 86 are adapted to be connected in the same manner as described previously with reference to container 36. Container 110 may also be provided on each side thereof with bumper elements 116. In view of the size of container 110 and more particularly, its fore and aft dimension, handles 112 must of necessity be located forwardly of the center of gravity of the container when filled with refuse. Thus, the container, when lifted off the ground by arms 58, would have a tendency to rotate or tip in a clockwise direction. For this reason, the rear end of hopper 12 is provided with a pair of roller bumpers 118 against which the front wall of container 110 rolls when the container is lifted off the ground by arms 58 and until such time as the radius rods 86 start to tip the container to the inverted position.

In the inverted position of container 110 (shown in broken lines in FIG. 11), the open upper end of the container overlaps substantially the opening for hopper 12. In order to obviate this difficulty, cover 120 is formed at the lower end portion thereof with a chute 124. Chute 124 has an upstanding wall 126 around three sides. The lower side of chute 124 adjacent the lower edge of cover 120 opens directly into the hopper. Chute 124 is dimensioned such that when the container 110 is in the fully inverted position, a portion of the rubbish in the container is discharged on chute 124 and in turn falls into the deepest part of the hopper through the upper open end of the hopper. Thus, the chute 124 accommodates the hopper for use with containers which would normally be considered too large in size for use with the hopper.

Figure 12:
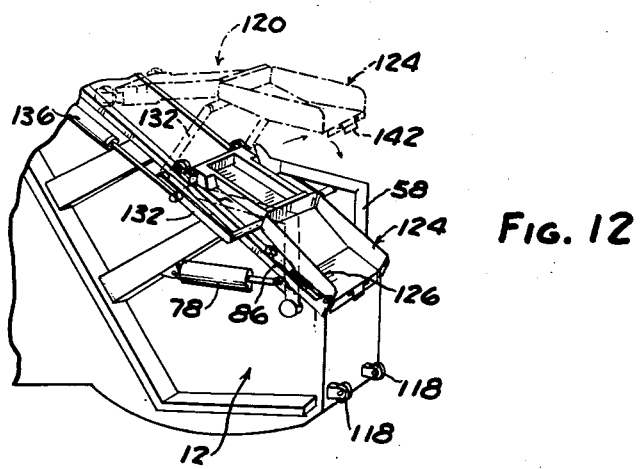
FIG. 12 is a fragmentary perspective view of the vehicle shown in FIG. 11 with the hopper cover in closed position.

The particular design of cover 120 on which chute 124 is mounted is not critical. It is important, however, that when the cover is in the fully opened position, chute 124 is so located as to form in effect an extension of the hopper opening which accommodates excessively large rubbish containers. The particular cover illustrated in FIGS. 11 and 12 has a pair of rollers 128 at opposite sides of its uppermost edge which supports the upper end of the cover for rolling movement on the top wall of the hopper. At a point intermediate its opposite ends, cover 120 is pivotally connected as at 130 with a pair of swinging levers 132 pivoted as at 134 to the opposite side walls of the hopper. Helper spring assemblies 136 pivoted at their upper ends to the top wall of the hopper as at 138 and connected to the levers 132 as at 140 are provided for assisting shifting of the cover 120 from the closed position shown in FIG. 12 to the open position shown in FIG. 11. In shifting to and from the position closing the hopper 12, cover 120 rolls at its upper end on the top wall of the hopper and the intermediate portion of the cover is pivoted in an arc by levers 132 as shown in FIG. 12. When cover 120 is in the closed position illustrated in FIG. 12, the springs in assemblies 136 are compressed such that these springs materially reduce the manual effort required to swing the cover from the closed position shown in FIG. 12 to the open position shown in FIG. 11. To facilitate manipulation of the cover, it is provided with a handle 142 at the lower end thereof.

Thus, it will be seen that the container handling device of this invention, by utilizing the combination of the arms 58 and the extensible links 86, possesses several very desirable features. In the first place, this arrangement enables picking up containers that are supported at different heights. By the same token, the arrangement described is capable of handling containers which vary considerably in size. Finally, the combination of the arms 58 with the extensible links 86 enables bodily moving the whole container to a generally inverted position directly over the deepest portion of the hopper on the vehicle.

I claim:

1. In a refuse vehicle of the type having a refuse storage compartment with a hopper at one end thereof and means for moving the refuse deposited in the hopper into the storage compartment, the refuse hopper having a generally open top, the combination comprising a pair of rigid lift arms pivoted on the vehicle, one at each side of the hopper, said arms having means at the free ends thereof for detachably connecting with lift handles of a container supported on a ground surface adjacent the hopper, said means at the free ends of said lift arms being arranged to scribe an arc about the pivot axis of the lift arms when the arms are pivotally actuated, means for pivoting said arms upwardly in unison for lifting the container engaged by the ends of the arms and a pair of links pivoted one at each side of the hopper, said links having means at the free ends thereof for engaging the container at points spaced from the detachable connection between the container and the lift arms, said links being shorter than the lift arms and the lift arms, when in generally horizontal position, extending outwardly beyond the free ends of the links, whereby when the arms are lifted, the container supported thereby is elevated and by reason of the relative length and disposition of the arms and links, the container is also pivoted upwardly about the ends of the links to an inverted position over the open end of the hopper.

2. A refuse vehicle as called for in claim 1 wherein the pivotal connections of the arms on the vehicle are spaced from the pivotal connections of the links on the vehicle.

3. A refuse vehicle as called for in claim 1 wherein said links comprise a pair of interconnected, axially extensible members.

4. A refuse vehicle as called for in claim 1 wherein said links comprise a pair of interconnected members which are freely extensible in a direction axially of the links.

5. In a refuse truck of the type having a refuse storage compartment with a hopper at the rear end thereof and means for moving the refuse deposited in the hopper forwardly into the storage compartment, the refuse hopper having a generally open top, the combination of a pair of rigid lift arms pivoted on the vehicle, one at each side of the hopper, said arms having means at the free ends thereof for detachably connecting with handle members of a container supported on a ground surface behind the hopper, said means at the free ends of said lift arms being arranged to scribe an arc about the pivot axis of the lift arms when the arms are pivotally actuated, power operated means for pivoting the arms upwardly in unison for lifting the container engaged by the outer ends of the arms and a pair of links pivoted one at each side of the hopper, said links having means at the free ends thereof for engaging the container supported by the arms at points spaced from the detachable connection between the container and the lift arms, said links being shorter than said lift arms and the lift arms, when in generally horizontal position, extending rearwardly beyond the free ends of the links when horizontally disposed, whereby when the arms are lifted, the container supported thereby is elevated and by reason of the relative length and disposition of said lift arms and links, the container is pivoted upwardly about the ends of the links to an inverted position over the open end of the hopper.

6. A refuse vehicle as called for in claim 5 wherein said power operated means comprises a hydraulic piston-cylinder assembly having a crank connection with said arms.

7. A refuse vehicle as called for in claim 5 wherein said links are pivoted on the vehicle for free swinging movement thereon.

8. A refuse vehicle as called for in claim 5 wherein said arms and said links, when generally horizontally disposed, project outwardly beyond the rear end of said hopper.

9. A refuse vehicle as called for in claim 8 wherein said arms are pivotable upwardly and in a direction forwardly of the vehicle to a position wherein the free ends of the arms are disposed above and forwardly of the rear end of the hopper.

10. A refuse vehicle comprising means forming a storage compartment for refuse, a hopper located at and communicating with the rear end of said storage compartment, means for moving refuse deposited in the hopper into the storage compartment, said hopper having a bottom wall and a pair of side walls, the upper end of said hopper being open and inclined in a plane extending downwardly and rearwardly, a pair of rigid lift arms pivotally supported on the vehicle, one at each side of the hopper, said arms having means at the free ends thereof for detachably connecting with handle members of a container supported on a ground surface adjacent and at the rear of said hopper, said means at the free ends of said lift arms being arranged to scribe an arc about the pivot axis of the lift arms when the arms are pivotally actuated, power operated means for pivoting said arms upwardly in unison to thereby lift the container engaged by the ends of the arms and a pair of links pivoted one at each side of the hopper for free swinging movement in a vertical plane, said links having means at the free ends thereof for engaging the container supported at the end of the lift arms at points spaced from the detachable connection between the lift arms and the container, said links being shorter than said lift arms and the lift arms, when in generally horizontal position, extending rearwardly beyond the free ends of the links when horizontally disposed, whereby when the arms are lifted, the container supported thereby is elevated and by reason of the relative length and disposition of the arms and links, the container is pivoted upwardly about the ends of the links to an inverted position over the open upper end of the hopper.

11. A refuse vehicle as called for in claim 10 wherein the arms and links, when horizontally disposed, extend rearwardly beyond the rear end of the hopper and wherein the deepest part of the hopper is spaced forwardly of the rear end of the hopper, said arms and links being arranged to lift and invert the container to a position disposed above said deepest portion of the hopper.

12. A refuse vehicle as called for in claim 10 including means at the open upper end of the hopper arranged to engage and support the container when in said inverted position.

13. A refuse vehicle as called for in claim 10 wherein said links comprise a pair of interengaged members which are freely extensible in a direction axially of the longitudinal axes of the links.

14. A refuse vehicle as called for in claim 10 including means mounted externally of the hopper at the rear end thereof for rolling engagement with the front wall of a container engaged by said arms when the arms are lifted.

15. A refuse vehicle as called for in claim 10 wherein the pivotal connections of the links on the vehicle are spaced from the pivotal connections of the arms on the vehicle.

16. A refuse vehicle as called for in claim 15 wherein the arms are pivotally connected to the vehicle at points below the pivotal connections of the links with the vehicle.

17. A refuse vehicle comprising means forming a storage compartment for refuse, a hopper located at and communicating with the rear end of said storage compartment, means for moving refuse deposited in the hopper into the storage compartment, said hopper having a bottom wall and a pair of side walls, the upper end of said hopper being open and inclined in a plane extending downwardly and rearwardly, a pair of lift arms pivotally supported on the vehicle, one at each side of the hopper, said arms having means at the free ends thereof for detachably connecting with handle members of a container supported on a ground surface adjacent and at the rear of said hopper, power operated means for pivoting said arms upwardly in unison to thereby lift the container engaged by the ends of the arms, a pair of links pivoted one at each side of the hopper for free swinging movement in a vertical plane, said links having means at the free ends thereof for engaging the container supported at the end of the lift arms at points spaced from the detachable connection between the lift arms and the container, said links being shorter than said lift arms and the lift arms, when in generally horizontal position, extending rearwardly beyond the free ends of the links when horizontally disposed, whereby when the arms are lifted, the container supported thereby is elevated and by reason of the relative length and disposition of the arms and links, the container is pivoted upwardly about the ends of the links to an inverted position over the open upper end of the hopper, of the hopper, said vehicle including a cover movably mounted thereon for optionally closing the open upper end of the hopper, said cover having a chute thereon which when the cover is in the open position forms a forward extension of the opening at the upper end of the hopper for accommodating containers which are larger then the open upper end of the hopper.

18. A refuse vehicle comprising means forming a storage compartment for refuse, a hopper located at and communicating with the rear end of said storage compartment, means for moving refuse deposited in the hopper into the storage compartment, said hopper having a bottom wall and a pair of side walls, the upper end of said hopper being open and inclined in a plane extending downwardly and rearwardly, a pair of lift arms pivotally supported on the vehicle, one at each side of the hopper, said arms having means at the free ends thereof for detachably connecting with handle members of a container supported on a ground surface adjacent and at the rear of said hopper, power operated means for pivoting said arms upwardly in unison to thereby lift the container engaged by the ends of the arms, a pair of links pivoted one at each side of the hopper for free swinging movement in a vertical plane, said links having means at the free ends thereof for engaging the container supported at the end of the lift arms at points spaced from the detachable connection between the lift arms and the container, said links being shorter than said lift arms and the lift arms, when in generally horizontal position, extending rearwardly beyond the free ends of the links when horizontally disposed, whereby when the arms are lifted, the container supported thereby is elevated and by reason of the relative length and disposition of the arms and links, the container is pivoted upwardly about the ends of the links to an inverted position over the open upper end of the hopper, said vehicle including a cover shiftably mounted thereon from a position closing the open upper end of the hopper to a position opening the upper open end of the hopper, said cover in the last mentioned position having its lower edge disposed adjacent the upper edge of the hopper opening, said cover having at the lower portion thereof a chute which, when the cover is shifted to the open position, forms a forward extension of the opening at the upper end of the hopper for accommodating containers which are larger than the open upper end of the hopper.

19. A refuse vehicle having a hopper at one end thereof, said hopper having an opening in the top thereof enabling the deposit of refuse from a container into the hopper, said opening being smaller than the top of the hopper and lying in a plane inclined to the horizontal, a cover shiftably mounted on the vehicle for movement from a position closing said opening to a position exposing said opening, said cover in its last mentioned position having one edge thereof disposed adjacent one edge of the opening in the hopper and being disposed generally parallel to said plane, said cover adjacent said last mentioned edge thereof having a chute thereon which, when the cover is shifted to said position exposing said opening, forms an inclined extension of the opening in the hopper at said edge thereof for accommodating refuse containers which are larger than the open upper end of the hopper.

20. A refuse vehicle as called for in claim 19 wherein said cover is shiftable forwardly of the vehicle to expose the opening at the upper end of the hopper and wherein said chute is located adjacent the rear edge of said cover.

References Cited in the file of this patent

UNITED STATES PATENTS

| 2,877,910 | Nelson | Mar. 17, 1959 |
| 2,928,562 | Gollnick | Mar. 15, 1960 |

FOREIGN PATENTS

| 316,655 | Switzerland | Dec. 15, 1956 |
| 510,294 | Canada | Feb. 22, 1955 |